United States Patent [19]

Shaver et al.

[11] 4,370,194
[45] Jan. 25, 1983

[54] ORIENTATION OF ORDERED LIQUIDS AND THEIR USE IN DEVICES

[75] Inventors: David C. Shaver, Cambridge; Henry I. Smith, Sudbury; Dale C. Flanders, Lexington, all of Mass.

[73] Assignee: Massachusetts Institute of Technology, Cambridge, Mass.

[21] Appl. No.: 149,483

[22] Filed: May 13, 1980

Related U.S. Application Data

[63] Continuation of Ser. No. 902,332, May 3, 1978, Pat. No. 4,256,787.

[51] Int. Cl.³ .......................... B05D 1/32; C23F 1/02; G02F 1/13; H01L 21/22
[52] U.S. Cl. .................. 156/643; 156/628; 156/654; 156/659.1; 156/101; 156/102; 156/145; 350/334; 427/12; 427/163; 427/165; 427/259; 427/269; 427/272; 427/282; 427/287; 428/1; 428/173; 430/1; 430/2; 430/20; 430/313
[58] Field of Search ............. 350/160 LC, 330, 147, 350/3.6, 3.69, 3.75, 331 R, 334, 337, 339 F, 340, 344, 397; 428/1, 13, 14, 201, 203, 209, 195, 210, 156, 157, 166, 167, 172, 173, 333, 913; 430/311, 313, 317-319, 1, 20, 2; 156/625, 628, 643, 654, 655-657, 659.1, 660, 99, 101, 102, 107, 145, 234, 235, 240; 427/43.1, 56.1, 162-165, 259, 264, 269-272, 282, 286, 287, 12, 35

[56] References Cited

U.S. PATENT DOCUMENTS 3,499,702 3/1970 Goldmacher et al. ............... 428/1
3,787,110 1/1974 Berreman et al. .................. 428/1
4,256,787 3/1981 Shaver et al. ...................... 428/1

OTHER PUBLICATIONS

Kahn, "Orientation of Liquid Crystals by Surface Coupling Agents", *Applied Physics Letters*, vol. 22, No. 8, 1973, pp. 386-388.

*Primary Examiner*—Bruce H. Hess
*Attorney, Agent, or Firm*—Arthur A. Smith, Jr.; Robert F. O'Connell

[57] ABSTRACT

Ordered liquids, or mesophases, are aligned by forming a structure on a substrate surface using a planar process of formation, the surface structure having a predetermined pattern, and applying a mesophase to the surface to substantially orient the molecules of the mesophase in accordance with the predetermined pattern. A liquid crystal display device can be made in which, in a preferred embodiment, the liquid crystal is confined between two substrates having oppositely disposed surfaces on which selected patterns of surface structures have been formed. The surface structures can be grating structures made of a conductive material, such as metal, which structures act to align the liquid crystal in accordance with the selected patterns, to polarize light passing through the surface structures, and to provide electrical contacts so that an electric signal applied thereto can produce an electric field in the region between the substrate surface structures.

15 Claims, 5 Drawing Figures

U.S. Patent   Jan. 25, 1983   4,370,194
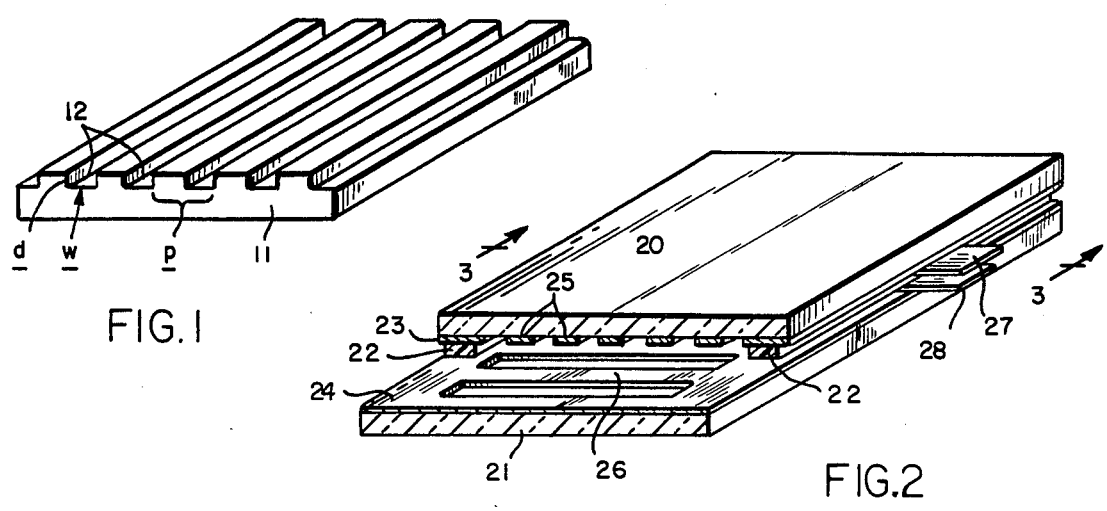
FIG.1
FIG.2
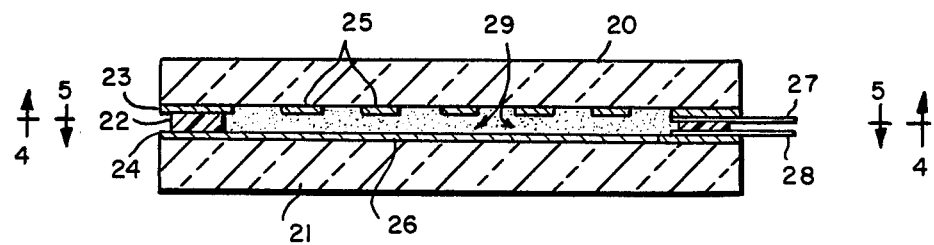
FIG.3
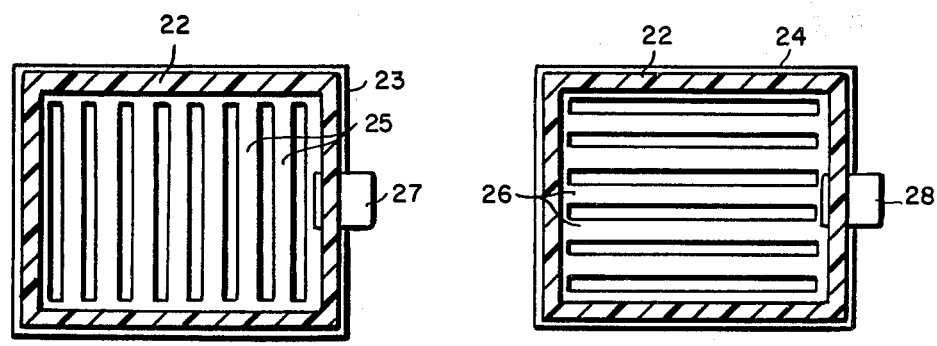
FIG.4
FIG.5

ORIENTATION OF ORDERED LIQUIDS AND THEIR USE IN DEVICES

The Government has rights in this invention pursuant to Contract Number AF19(628)-76-C-0002 awarded by the U.S. Dept. of the Air Force.

This is a continuation of application Ser. No. 902,332, filed May 3, 1978 now U.S. Pat. No. 4,256,787.

INTRODUCTION

This invention relates generally to the treatment and use of ordered liquids, such as liquid crystals, and, more particularly, to the orientation of such ordered liquids and the use of suitably oriented liquid crystals in display devices.

BACKGROUND OF THE INVENTION

A number of liquids exhibit properties which are normally associated with crystalline solids and such materials have often been referred to as "ordered liquids". Such ordered liquids effectively exist in states or phases which are intermediate between an isotropic liquid phase, where molecules thereof are randomly oriented and not arranged on a three-dimensional lattice, and a crystalline solid phase wherein the molecules are positioned at well-defined sites on a three-dimensional lattice and are oriented with respect to the lattice. Materials in such intermediate phases are sometimes designated as "mesophases". One group of such mesophases has been designated as "liquid crystals" which materials are finding greater use, particularly as materials for display purposes such as in wrist watches, calculators, panel meters, and the like.

One of such mesophases, or mesomorphic states, is the nematic state which can be formed on cooling from an isotropic liquid melt. In the nematic state the molecules are not fixed on any kind of lattice and they are free to move about, imparting to the material the property of fluidity, but the molecules, which are generally elongated, tend to align with respect to each other, imparting a long-range orientational order to the liquid.

A second mesomorphic state is the smectic state which displays a greater degree of order than the nematic state. The molecules tend to exhibit a long-range orientational order and further order themselves by forming substantially planar layers. Other mesophases include the cholesteric phase and the lyotropic liquid crystals.

The major application for nematic liquid crystals has been in display devices. Several different types of nematic liquid crystal displays have been described but all have the property that the surfaces which contact the liquid crystal layer are treated in such a manner as to produce a predetermined orientational alignment of the liquid crystal molecules. In one particular type of display, such nematic liquid crystals are placed within a display device between two surfaces which have been treated so that the molecules of the liquid crystal adjacent the oppositely disposed surfaces are aligned orthogonally, the molecules therebetween being aligned at angles therebetween so that the overall device is said to comprise a "twisted nematic" liquid crystal display, as is well known in the art.

In order to comprise a useful device, said "twisted nematic" display must include a polarizer of light on each side of the twisted nematic liquid crystal layer with the polarizing directions of said polarizers selectively oriented with respect to each other and to the liquid crystal layer. Also, electrically conducting plates must be placed on opposite sides of the liquid crystal layer in order to modify the alignment of the intermediate liquid crystal by the application of electrical fields, but said conducting plates must be relatively transparent to light in order to permit passage of light through the device consisting of polarizers, conducting plates, and the twisted nematic layer.

Alignment of the molecules of ordered liquids such as liquid crystals has been achieved in the past by placing the liquid crystal in contact with a surface which has been made relatively anisotropic so that the molecules align along a specified direction. The treatment of the surface has been obtained in various ways. For example, the surface is often rubbed with an abrasive as described in the article by Creagh and Kmetz, Mol. Cryst. and Liq. Cryst. 24, 59 (1973). Other techniques have utilized directed oblique evaporation of silicon monoxide as described in the articles by Janning, Appl. Phys. Lett. 21, 173 (1972) and Dixon et al., Appl. Phys. Lett. 24, 47 (1974), the latter also suggesting the use of parallel grooves but nowhere disclosing any specific process that could be successfully used for such purpose. Still others have suggested the technique of dipping the surface in surfactants as described in the article of Proust et al., Solid State Communications 11, 1227 (1972). Others have scratched the surface with a diamond pencil, as discussed by Wolff et al., Mol. Cryst. and Liq. Cryst., 23, 187 (1973).

Such techniques have been used for aligning nematic liquid crystals and it is believed that such alignment minimizes the free energy associated with elastic deformation of the liquid crystal. Oblique evaporation and rubbing techniques tend to produce surfaces with a topography that is largely uncontrolled and, in the case of rubbing techniques, particularly difficult to reproduce. Oblique evaporation further does not permit arbitrary alignment since such techniques can generally only be readily used for aligning molecules in a single specified direction. Moreover, while the quality of alignment may be useful in many applications, other applications requiring higher quality alignment will not be able to effectively use surfaces which have been treated by oblique evaporation techniques. While the use of surfactants has produced alignment, often such alignment is of a semi-permanent nature only and will, in effect, disappear over a reasonable time period. Moreover, in some applications the surface which has been treated with surfactants must be subsequently processed at a relatively high temperature which can effectively destroy the surfactant as well as the alignment which has been achieved thereby. Anisotropy produced by rubbing may also be destroyed by high temperature sealing of liquid crystal cells.

Accordingly, it is desirable to provide a process for treating a surface which improves the quality of alignment or orientation thereof so that mesophases can be permanently and reliably aligned in a substantially reproducible fashion. Furthermore, a process is desired which is well-suited for producing patterns of liquid crystal alignment more complex than the generally unidirectional alignment which is easily obtained with the prior art methods. With respect to liquid crystal display devices utilizing twisted nematic liquid crystals, such devices normally utilize separate polarizing elements, separate elements for aligning the liquid crystals, and additional separate elements for providing the desired electric field therein. It is desirable to obtain such a structure in a way which would reduce the present costs thereof and also provide for a relatively more rugged structure than is currently available for such purpose. Less expensive display devices which are less easily damaged by high temperature or humidity should find an even broader market than presently available liquid crystal display devices.

BRIEF SUMMARY OF THE INVENTION

In accordance with the invention the orientation of mesophases is obtained by forming a surface structure having a particular pattern on a surface of a substrate by utilizing a "planar process" of formation and applying a mesophase to such surface, the surface structure thereby substantially orienting the molecules of the ordered liquid in a predetermined pattern thereof. Such surface structure, for example, may be a relief structure in the form of a grating by which the molecules of the ordered liquid can be aligned along the direction of the grating grooves for use, for example, in a liquid crystal display device which requires a uniform orientation of molecules along the same direction. It has been found that the use of such surface structures in aligning ordered liquids provides a higher quality orientation or alignment thereof than is available in the prior art techniques which have heretofore been used for such purpose. Moreover, in the fabrication of twisted nematic liquid crystal display devices, the grating which is used in accordance with such techniques can be formed of a metal, said grating being appropriately formed on a glass, or other suitable transparent substrate. The device can then be formed of two oppositely disposed substrates separated by appropriate spacers, the directions of the gratings on the oppositely disposed surfaces thereof being arranged orthogonally. A liquid crystal is then positioned between the spaced substrates and the liquid crystal aligns itself therewith in a twisted nematic configuration as is required. Since the gratings are metallic, suitable conductors can be placed in contact therewith for applying suitable electric fields as is needed in liquid crystal displays. A plurality of such devices can be utilized in fabricating an overall display as is well known to those in the art.

In accordance with such structure the metallic gratings serve not only to align the liquid crystals in the desired manner but also serve to provide the electrically conducting plates required, and further act as polarizers of light for providing the polarization required in such liquid crystal display devices. Accordingly, all three of such functions can be achieved by the use of metallic gratings on the substrate surfaces thereby avoiding the necessity for providing separate elements to achieve each such functions as in prior art devices.

DESCRIPTION OF THE INVENTION

The invention can be described in more detail with the help of the accompanying drawings wherein:

FIG. 1 shows a perspective view of an exemplary structure used to orient mesophases in accordance with the invention;

FIG. 2 shows a perspective view of an embodiment of a display device in accordance with the invention;

FIG. 3 shows a view in section along lines 3—3 of the embodiment of FIG. 2; and

FIGS. 4 and 5 show views in section along 4—4 and 5—5 respectively of the embodiment of FIG. 3.

In accordance with the invention a surface structure is provided on a substrate in accordance with the use of "planar process" techniques. As used herein the term "planar process" refers to a specific manner in which surface structures are fabricated. In accordance therewith the planar process always involves a step, or steps, called the "microlithographic process" wherein a pattern is defined in a masking substance, often called a resist, on the substrate. Thus, methods for forming said pattern include the exposure of a polymeric, or other resist, using visible light, ultraviolet light, x-rays, electrons, or ions, whether said exposure occurs by forming a complete image of the pattern on the resist or by successive exposure of elements of the pattern using a scanned beam of the light, x-rays, electrons, or ions. Projection and contact photolithography, x-ray lithography, scanning-electron beam lithography, electron beam imaging, holographic exposure, and scanned laser beam pattern generators are among the methods of resist exposure which can be used by those skilled in the art for such purpose. Polymerization of mobile monomers directly on the substrate by an electron beam (so-called "contamination writing") can also be used to define such pattern on the substrate. The aforementioned step, or steps, used to define the pattern on the substrate can be referred to as the microlithographic process.

After completion of the microlithographic process, the planar process of surface structure fabrication may be complete, i.e., the pattern formed in the resist may be used as the completed surface structure. Alternatively the pattern defined in the resist may itself be used as a mask for processes involving etching, doping, or deposition wherein the pattern is etched into or formed in or upon the substrate. The resist can be removed after the pattern has been formed in or on the substrate. This latter pattern may also be used as a mask for subsequent etching, doping, growth or deposition.

The aforementioned planar process can be distinguished from processes of the prior art for several reasons. First, patterns significantly more complex than parallel grooves are easily obtained by the planar process. Second, the patterns which are formed by the planar process are predictable. Third, the planar process allows for simple, high-speed production techniques to be used even for complex patterns of surface structures in contrast to scribing techniques, for example, where surface features must be sequentially cut into the surface. Fourth, the pattern is not formed directly in the surface by serial mechanical means, as in rubbing or scribing. Moreover, with oblique evaporation techniques, though a complex pattern of surface relief structures is produced and the orienting effect on mesophases may be well defined, only a surface "texture" is really produced. That is, a specific controlled pattern of surface structures is not produced, and complex patterns of mesophase alignment cannot be obtained as readily as when the surface structures are under direct control.

Even with oblique evaporation techniques, microlithographic steps have been used to define patterns. However, the patterns have been used to delineate comparatively large structures, such as the characters in alpha-numeric displays and have not been used to produce the surface structure responsible for alignment, but only to define the area over which the obliquely evaporated layer produces alignment.

Also included under the term "planar process" as used herein are any processes which reproduce a substrate having surface structures which have been fabricated by the planar process as described above, such reproduction, or replica formation, being obtained by methods such as pressing, casting, printing, and the like.

Thus, a surface structure of desired configuration can be produced on a substrate, such as fused quartz, in accordance with such planar process. Exemplary planar process techniques producing such surface relief structures have been described, for example, in the article "Surface Relief Structures with Linewidths below 2000 Å", D. C. Flanders et al., Appl. Phys. Lett. 32 112 (1978).

By using a planar process technique, a surface structure of a predetermined pattern, or configuration, can be obtained on a selected surface of a substrate. In accordance with the invention such surfaces can thereupon be utilized for aligning mesophases of which liquid crystals, for example, are an exemplary type, by applying such ordered liquids to the surface in contact with the surface structure. It has been found that the molecules of the mesophase become substantially aligned in a predetermined manner by interactions with the surface structure.

A simple form of surface structure, for example, may be a relief structure in the form of a grating which, as shown in FIG. 1, comprises a plurality of parallel grooves 12 obtained in a fused quartz substrate 11. Such grooves, as formed by the planar process discussed above, have substantially uniform depths d and uniform widths w as well as uniform periods p. If a layer of a mesophase (not shown) is placed on the substrate in contact with the grating relief structure shown, the molecules of the mesophase will become substantially aligned along the direction of the grooves, provided the spatial period p of the gratings is sufficiently small, typically less than a few micrometers. Experiments show, for example, that when MBBA (N-(p-methoxybenzilidene)-p-butylaniline) is used as the liquid crystal with fused quartz substrates having square-wave gratings of depth, d, equal to 25 nm., excellent alignment is achieved using gratings of 320 nm. period whereas gratings of 12 $\mu$m. period produce only a weak alignment effect. It appears unlikely that a period greater than about 15 $\mu$m. would produce significantly useful alignment. Though good alignment was achieved using gratings of a 3.8 $\mu$m. period, fewer disclinations and other alignment defects were present when 320 nm. period gratings were used.

For example, in a specific alignment which has been achieved utilizing a nematic liquid crystal the spatial period, p, was 320 nm. The period, though small, is considerably larger than the long axis (the largest dimension) of the molecules (approximately 2 nm.) which are being aligned. In a specific embodiment of the invention which produced successful alignment, the gratings were fabricated in $SiO_2$ by reactive ion etching in a $CHF_3$ gas using a mask of 100 Å thick chromium. The chromium grating was produced by a lift-off process from a grating pattern exposed in PMMA using $Cu_L$ soft X-ray lithography, as discussed in the above referenced Flanders et al. article. Holographic lithography, in accordance with well-known techniques, was used as the pattern generation step in producing the X-ray mask. The etch depth of the $SiO_2$ gratings was about 25 nm., the vertical side walls of the grating being within about 6 degrees of the vertical and the radius of curvature at the top and bottom corners of the side walls being less than about 5 nm. In accordance therewith, such gratings were fabricated over an area 1.25 cm. square on a highly polished fused quartz substrate.

Other appropriate relief structure configurations may be formed on appropriate substrates using such planar process techniques and, in accordance with the invention, mesophases are found to become aligned with the pattern of the relief structure which is so formed.

While the particular relief structure discussed above is in the form of a grating (i.e., substantially parallel grooves) other configurations can be formed to align mesophases in accordance with arbitrary desired patterns.

The planar process is ideally suited to the formation of arbitrary patterns of surface relief structures, such as grids, concentric circles, radial lines, and sinusoidal or other periodic structures. For example, a spiral could be fabricated on a surface and might be used to produce an oriented nematic liquid crystal layer with the nematic director varying with the direction of said spiral. Nematic layers might then be cooled to "glassy" solid phases which retain the nematic ordering. Thus, solid layers with optical properties characteristic of crystals (i.e. birefringence) but with structures more complex than those of crystals can be manufactured. Such arbitrary patterns are not readily fabricated using prior art methods of alignment.

Though the planar process can be applied to form parallel grooves or other surface relief structures, it is possible to use the planar process to define a structure on a substrate where little or no topographic "relief" exists. For instance, using a patterned masking layer, a dopant, such as those used in semiconductor processing, might be diffused or implanted into the surface, and the masking layer could be removed in a subsequent step. No surface relief structure would be present. However, the surface would be chemically altered in the regions exposed to the dopant and could interact differently with the liquid crystal molecules in these regions. The structure consisting of a pattern of doped regions would influence the overall alignment of the liquid crystal layer.

As a further example of a process where little or no relief structure is formed, a grating of 12 $\mu$m. period was formed in 30 nm. thick chromium on a quartz substrate. The substrate was coated with the silane coupling agent DMOAP as described in the article KAHN, Applied Physics Letters, 22: 386–388 (1973). Then, the chromium layer was removed leaving a grating pattern on the surface consisting alternately of clean quartz lines and DMOAP covered lines. The DMOAP layer is presumably a monolayer thick, and the grating hardly constitutes a relief grating. However, MBBA (a liquid crystal) orients perpendicular to DMOAP coated quartz whereas on clean quartz its orientation is not perpendicular to the surface. Since the lines are spaced closely enough, the neighboring regions interact and the liquid crystal tends to align along the direction of the lines and with a tilt with respect to the substrate.

A particularly useful application of such techniques for providing suitably oriented mesophases is in the field of liquid crystal display devices. As is known, the use of twisted nematic liquid crystals between two surfaces can be utilized to control the light passing through a display by the use of an electric field. The liquid crystal cell is sandwiched between two orthogonally oriented polarizers. Polarized light entering the cell "follows" the twisted nematic and, accordingly, the polarization is rotated by 90°, and as such can pass through the second polarizer. Application of an electric field, however, changes the molecular alignment so that the cell will not rotate the plane of polarization and no light will be transmitted. Such a device may be used to control the transmission of light, or the effect of the liquid crystal display may be observed in reflection by placing a reflecting surface behind the display. If, in addition, one of the electrodes is shaped in a pattern or segments of characters, a character can be made to appear when a voltage is applied to the appropriate segment(s). By changing the relative orientation of the polarizers the character can be made to appear light on a dark background.

In accordance with such prior art structures, in order to achieve a liquid crystal display effect, three basic elements are required, namely, a pair of crossed-polarizers, appropriately treated surfaces for producing alignment of the molecules of the liquid crystal, and suitable electrodes to which voltage can be applied for producing an electric field. Such elements are normally separately fabricated and suitably packaged in accordance with well-known liquid crystal display techniques.

A simplification of such structures can be achieved in accordance with the invention so that the overall cost of the device is considerably reduced and the device made relatively more rugged than presently available devices.

In accordance therewith a device can be formed as shown in the exemplary device shown in FIGS. 2–5. As can be seen therein, a pair of glass substrates 20 and 21, which are transparent to the passage of light, are oppositely disposed with respect to each other and separated by a spacer element 22. Layers of electrically conductive material 23 and 24, respectively, are formed on each of the oppositely disposed surfaces of substrates 20 and 21. Gratings 25 and 26, respectively, are formed in each of the metallic layers by a planar process, as discussed above, e.g., using techniques as described in the above referenced Flanders et al. article. The grooves of grating 25 formed in layer 23 are aligned in an orthogonal direction with respect to the grooves of grating 26 formed in layer 24. The gratings are formed only over a selected area of the surface in each case, as shown best in FIGS. 4 and 5. Electrical contact elements 27 and 28 are placed in contact with each of the metallic layers at a region beyond the grating region thereof, as shown in FIGS. 2–5.

In a particular device which was so fabricated, the metallic layer was formed of gold about 100 nm. thick on a glass substrate, the grooves formed therein extending to the glass substrate, the widths of the grooves were approximately 100 nm., and the period was approximately 320 nm. The glass substrate was approximately 200 μm. (i.e., approximately 0.008") thick. Such gratings were formed using holographic lithography and ion-beam etching as discussed in the above-referenced Flanders et al. article. The gold grating lines were interconnected by the continuous gold region which surrounded the grating area and the spacers were made of Teflon and provided for approximately a 12 μm. spacing between the substrates.

A nematic liquid crystal material 29 was introduced into the spacing between the substrates while in the isotropic liquid phase and filled such spacing by capillary action. The molecules thereof were found to become aligned in the required twisted nematic configuration after cooling to the nematic phase. Accordingly, all of the elements of a twisted nematic display device were present in the structure. The gratings provided the required pair of liquid crystal aligning surfaces positioned at right angles to one another, as shown. Such gratings further acted as light polarizers since metallic gratings with P< wavelength of light are capable of polarization, and in accordance with their orientation, acted as crossed-polarizers. Moreover, the gratings were electrically conductive and thereby act as effective conducting parallel plates which were capable of aligning the liquid crystal material by means of an electric field obtained by applying a suitable electrical voltage across the terminals 27 and 28.

Such a structure is greatly simplified over the structures normally used in presently available liquid crystal display devices and is extremely compact and rugged so that it can be utilized in a great many applications where liquid crystal displays are required. Moreover, unlike twisted nematic displays utilizing previously known techniques, no temperature or humidity problems related to the polarizers arise with the use of a metallic grating.

While the specific embodiments of the invention have been discussed above, other embodiments and configurations utilizing the techniques of the invention will occur to those skilled in the art in accordance with the spirit and scope of the invention. Hence, the invention is not to be construed as limited to the specific embodiments discussed above except as defined by the appended claims.

We claim:

1. A method for orienting the molecules of liquid crystals comprising the steps of
    forming an intermediate masking layer having a predetermined pattern on a selected surface of a substrate;
    transferring said predetermined pattern to said selected surface using a planar process which forms a surface relief structure having said predetermined pattern, said surface relief structure being formed so as to have substantially vertical side walls and substantially square corners; and
    applying a liquid crystal to said selected surface of said substrate, said surface structure substantially orienting the molecules of said liquid crystal in accordance with said predetermined pattern.

2. A method in accordance with claim 1 wherein said predetermined pattern is a plurality of substantially parallel grooves.

3. A method in accordance with claim 2 wherein said grooves have substantially the same dimensions and are substantially uniformly spaced on said selected surface.

4. A method in accordance with claims 2 or 3 wherein the spacings between the grooves are less than 15 μm.

5. A method for orienting the molecules of liquid crystals in accordance with claim 1 wherein said planar process uses ion-beam etching to form said surface relief structure.

6. A method for orienting the molecules of liquid crystals in accordance with claim 1 wherein said planar process uses holographic lithography to form said surface relief structure.

7. A method in accordance with claim 1 wherein said intermediate masking layer is formed using holographic lithography.

8. A method in accordance with claim 1 wherein said planar process uses reactive ion etching to form said surface relief structure.

9. A method in accordance with claims 1, 5, 6 or 8 wherein said predetermined pattern is a plurality of substantially parallel grooves.

10. A method in accordance with claim 9 wherein said grooves have substantially the same dimensions and are substantially uniformly spaced on said selected surface.

11. A method in accordance with claim 9 or 10 wherein the spacings between the grooves are less than 15 μm.

12. A method for orienting the molecules of liquid crystals comprising the steps of forming a surface structure on a selected surface of a substrate using a planar process of formation, said selected surface having a surface structure of a predetermined pattern having no topographical relief;

applying a liquid crystal to said surface structure so that the molecules of said liquid crystal at or near said selected surface are substantially oriented in accordance with the non-topographical predetermined pattern of said surface structure thereon.

13. A method in accordance with claim 12 wherein said predetermined pattern comprises a first plurality of surface regions formed from a first selected material and a second plurality of surface regions formed from a second selected material, said first and second materials being selected to interact differently with said liquid crystal.

14. A method in accordance with claim 13 wherein one of said first and second selected materials is a silane coupling agent.

15. A method in accordance with claim 13 wherein one of said first and second selected materials is a dopant.

* * * * *